United States Patent
Drobitko et al.

(10) Patent No.: US 11,734,830 B2
(45) Date of Patent: Aug. 22, 2023

(54) METHOD OF FACADE PLANE DETECTION

(71) Applicant: SketchAR, Vilnius (LT)

(72) Inventors: Andrey Drobitko, Kaliningrad (RU);
Aleksandr Danilin, Zarechniy (RU);
Mikhail Kopeliovich, Rostov (RU);
Mikhail Petrushan, Rostov (RU)

(73) Assignee: SKETCHAR, VAB, Vilnius (LT)

( * ) Notice: Subject to any disclaimer, the term of this patent is extended or adjusted under 35 U.S.C. 154(b) by 13 days.

(21) Appl. No.: 17/367,375

(22) Filed: Jul. 4, 2021

(65) Prior Publication Data

US 2021/0374457 A1    Dec. 2, 2021

Related U.S. Application Data

(63) Continuation-in-part of application No. 16/888,760, filed on May 31, 2020, now Pat. No. 11,307,731.

(51) Int. Cl.
*G06T 7/13* (2017.01)
*G06V 10/44* (2022.01)
(Continued)

(52) U.S. Cl.
CPC .......... *G06T 7/13* (2017.01); *G06T 7/181* (2017.01); *G06T 7/73* (2017.01); *G06V 10/267* (2022.01);
(Continued)

(58) Field of Classification Search
CPC ........ G06F 3/011; G06F 3/005; G06F 3/0304; G06F 3/04842; G06F 3/04815; G06T 19/006; G06T 2200/24; G06T 2207/10024; G06T 7/60; G06T 2200/04; G06T 2219/024; G06T 7/11; G06T 2207/10028; G06T 7/12; G06T 7/73; G06T 7/13; G06T 17/00; G06T 7/136; G06T 7/74; G06T 7/50; G06T 2207/20076; G06T 2210/04; G06T 7/521; G06T 7/564; G06T 2210/12; G06T 7/33; G06T 7/70; G06T 7/80; G06T 15/20; G06T 2207/20192; G06T 7/187; G06T 7/246; G06T 11/40; G06T 2215/16; G06T 7/001; G06T 7/10; G06V 20/20; G06V 20/10; G06V 10/40; G06V 10/20; G06V 10/758; G06V 20/40; G06V 10/764; G06V 20/39; G06V 20/176; G06V 10/44; G06V 20/64; G06V 10/10; G06V 2201/12; G06V 10/25; G06V 10/26; G06V 20/693; G06V 10/50; G06V 10/457; G06V 10/467
See application file for complete search history.

(56) References Cited

U.S. PATENT DOCUMENTS

| 8,295,607 B1 * | 10/2012 | Biswas | G06T 7/136 |
| | | | 382/199 |
| 2004/0165786 A1 * | 8/2004 | Zhang | G06V 30/146 |
| | | | 382/276 |

(Continued)

*Primary Examiner* — Xiao M Wu
*Assistant Examiner* — Scott E Sonners
(74) *Attorney, Agent, or Firm* — Inventa Capital PLC

(57) ABSTRACT

A computer-implemented method of using augmented reality (AR) to detect a plane and a spatial configuration of an object, the method comprising the steps of detecting one or more edges of the object; identifying one or more lines of the object; filtering the one or more lines of the object; iteratively approximating one or more distributions of the one or more lines; and determining boundaries of the object.

13 Claims, 4 Drawing Sheets

(51) Int. Cl.
*G06T 7/181* (2017.01)
*G06V 20/20* (2022.01)
*G06T 7/73* (2017.01)
*G06V 10/26* (2022.01)
*G06T 19/00* (2011.01)

(52) U.S. Cl.
CPC ............ *G06V 10/443* (2022.01); *G06V 20/20* (2022.01); *G06T 19/006* (2013.01)

(56) References Cited

U.S. PATENT DOCUMENTS

| | | | |
|---|---|---|---|
| 2011/0274353 A1* | 11/2011 | Yu | G06V 20/10 382/173 |
| 2013/0051671 A1* | 2/2013 | Barton | G06T 7/181 382/173 |
| 2013/0335575 A1* | 12/2013 | Tsin | G06T 7/75 348/169 |
| 2016/0055268 A1* | 2/2016 | Bell | G06V 20/00 703/1 |
| 2018/0061036 A1* | 3/2018 | Mostafavi | H04N 13/204 |
| 2019/0087962 A1* | 3/2019 | Hayashi | H04N 1/3873 |
| 2020/0167588 A1* | 5/2020 | Ohara | G06V 30/1475 |
| 2022/0018098 A1* | 1/2022 | Nakagi | G06F 3/0484 |
| 2022/0398711 A1* | 12/2022 | Lin | G06T 7/0002 |

\* cited by examiner

METHOD OF FACADE PLANE DETECTION

FIELD OF THE INVENTION

The present invention relates to a computer implemented platform, a software, and a method using an augmented reality (AR) technology for placing of the augmented reality content over real world objects.

BACKGROUND OF THE INVENTION

Today, an augmented reality (AR) technology is used for displaying, through mixing, information about a virtual object created by computer technology and a real world, in the real world visible to a user. There are various fields where AR are used. These fields include and are not limited to games, management of a manufacturing process, education, telemedicine, and the like. It is important to mention that interest in AR is growing due to more widespread distribution of mobile terminals to which AR technology may be applied, such as, a smart phone.

Various prior art systems and methods for displaying augmented reality (AR) content are known. Typical prior art AR device may include a display configured to display real-world content overlaid with AR content and at least one sensor configured to provide an output indicative of an orientation, location, or motion of the AR device. The system may also include a processor device configured to: cause the AR content to be shown on the display at an initial location on the display; determine a change in orientation of the AR device based on the output of the at least one sensor; and change a position of the AR content on the display to a second location on the display, wherein the change in position of the AR content from the initial location to the second location is related to the determined change in orientation of the AR device.

In some instances, displaying the AR content can interfere with the view of the real world. For example, displayed AR content may overlap with an object of interest in the real world and may obscure either partially or fully a user's view of the real-world object of interest. This can be inconvenient, distracting, or dangerous to the user.

In other instances, an amount of available AR content may exceed the display capabilities of the device or may require more space on the display than is available within a designated or predetermined virtual content display area on the display. Some disclosed embodiments may address these issues by enabling a user to reposition AR content on a display such that it does not interfere with (or at least interferes with less of) the user's view of real-world objects.

Placement of augmented reality content over real world objects requires precise tracking of such objects in consequent frames of video stream. Even small mislocation of surface's position in video frame may lead to visibly significant disturbances of augmented reality content. Thus, an algorithm is required capable to produce accurate tracking of observable surface in images. Furthermore, tracking algorithm should be robust under certain variations of observation point's position, illumination, shadows positions even in a case of "featureless" textures like such on white paper. Effective approach for tracking surfaces with low-intensive textures is to place hand drawn markers over texture. Such markers should be trackable and distinguishable from surrounding texture areas. For example, simple-form markers like circles, triangles, crosses, or complex-form markers like QR codes may be used on white paper surface for it's robust tracking. Obvious lack of this approach is the necessity to draw or print additional elements on observing object.

Moreover, if some hand-drawn markers are failed to detect, accuracy of tracking may suffer significantly. Therefore, an opportunity exists for improved system and method that will use algorithm of markerless tracking of plane surfaces in video images which will not require additional marks and be capable to deal with surfaces with low intensity textures.

Two known basic approaches for tracking are: static template approach and template update approach. Static template means that template patches descriptors are not updated during tracking. This method may fail to track patches in a case of strong transform (scaling, rotation, perspective) between template and current image especially if descriptors are low-invariant to such transform.

Template update approach involves step of patches descriptors update in each frame where patches were successfully tracked. Such update enables tracker to deal with even strong transforms since descriptors evolve together with transform evolution. Known lack of template update method is patches drift when forced update in each frame invokes slow change of descriptors even in motionless case.

Alluding to the above, the AR content to be placed on real world objects in video, such objects should be accurately tracked in each frame in real time. Objects for the AR content anchoring could be planar or curved surfaces. Examples of planar objects are table plane, paper list, wall, facade of a building. Determining of spatial configuration of anchoring surface is critical for the AR content to be correctly visualized. In contrast to other objects like paper list, facade borders can be uncertain or overlapped another objects (trees, cars).

Therefore, façade borders solely cannot be used to determine façade plane configuration. New method for facade plane detection is proposed herein, where detection is based on assumption of predominance of vertical and horizontal lines on façade surface in physical world. Thus, perspective transform can be determined by detection of horizontal and vertical lines distributions in image.

SUMMARY OF THE INVENTION

A computer-implemented method of using augmented reality (AR) to detect a plane and a spatial configuration of an object, the method comprising the steps of detecting one or more edges of the object; identifying one or more lines of the object; filtering the one or more lines of the object; iteratively approximating one or more distributions of the one or more lines; and determining boundaries of the object. The step of detecting one or more edges of the object is based on an adaptive binarization and a variance thresholding. The adaptive binarization is determined based on a threshold that is calculated as a function of image intensities in a local area of a pixel having x and y coordinates.

The variance thresholding comprises storing a value of an intensity variance in a pixel having x and y coordinates to establish a variance map, wherein said variance thresholding is calculated based on a maximum value of the intensity variance over the object. The method of the present invention further includes the step of establishing an edge mask for the one or more edges, wherein the edge mask is computed as a sum of the adaptive binarization and the variance thresholding.

The step of identifying one or more lines comprises detecting one or more lines in an edge mask by implementing Hough transform technique. The step of filtering the one or more lines of the object comprises determining if the one or more lines are vertical, horizontal, or diagonal. The step of iteratively approximating distributions of the one or more lines comprises estimating a coefficient for each of the one or more lines, wherein the coefficient is estimated separately for horizontal lines and vertical lines.

The method further comprises the step of identifying one or more lines not belonging to the object; and filtering by the step of iterative approximation the one or more lines not belonging to the object. In response to more than one plane detected for the object, a histogram of distribution of the coefficient is calculated. The step of determining boundaries of the object comprises determining outermost lines in the one or more distributions such that one or more intersections of the one or more lines are inside an image of the object and inside a segmentation mask.

An advantage of the present invention is to provide the improved system and method that will use marker-less tracking algorithm (tracker) consisting of initialization, regular tracking, and reinitialization procedures.

Another advantage of the present invention is to provide the improved mobile application that is fully-fledged tool for teaching drawing using augmented reality, machine learning, and neural networks, wherein the mobile application is available on iOS, Android, MS HoloLens, whereby the mobile application puts virtual images on paper to let the user trace drawings from the phone using the augmented reality.

Still another advantage of the present invention is to provide the improved mobile application that uses technology based on computer vision that allows the user to scan the environment and fix the virtual image over a real surface.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

Figure 1:
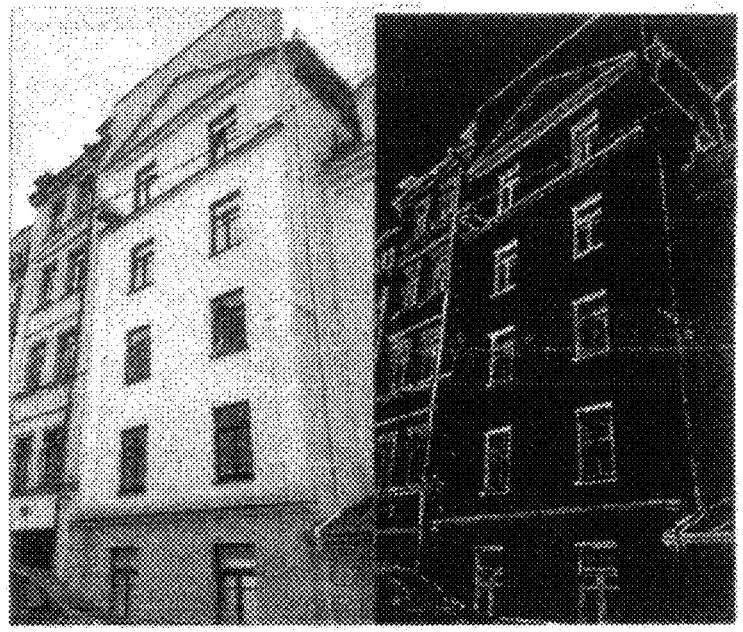
FIG. 1 illustrates a view of an example of edges mask (right) computed for the image on the left.

Referring to the FIGS. 1 through 6, a method of using augmented reality (AR) to detect a plane and a spatial configuration of an object is shown. Because explicit identification of object-oriented constructs expressed through the syntax of high-level object-oriented programming languages is lost during compilation to binary code (e.g., translation of a source code definition or representation of an application to a binary code definition or representation of the application such as a machine code or byte-code definition), potential security vulnerabilities can be obscured during static analysis of the resulting binary code. For example, because information about an object (e.g., the class on which the object is based, the size of the object, the number and types or sizes of properties of the object, and the number of functionalities accessible to the object via a dispatch table) is typically not expressed in binary code, determining whether indirect operations relative to the object expose security vulnerabilities can be difficult without the source code from which the binary code was generated.

As a specific example, an indirect operation can result in arbitrary code execution security vulnerabilities if the binary code does not include run-time validation to ensure that the indirect operation does not operate outside or beyond the object (i.e., at memory addresses not allocated to or shared by the object). Some binary code representations of applications, however, do include information about objects. Such information can be included in binary code as run-time type information (RTTI) or debugging information that is compiled into the binary code. Nevertheless, because the binary code representations of many applications do not include such information (e.g., to discourage reverse engineering of these applications), robust methodologies and systems for analyzing binary code based on (or derived from) source code using object-oriented techniques should not assume availability of such information.

Implementations discussed herein analyze operations described in binary code to identify objects based on those operations. Said differently, implementations discussed herein reconstruct, at least partially, objects (or representations of objects) by inferring the structure of such objects based on operations described in binary code. Thus, implementations discussed herein can identify objects and attributes such as a size thereof without referring to (or independent of) source code or explicit information about such objects which may or may not be included in the binary code. Furthermore, implementations discussed herein perform security vulnerability analyses of binary code representations of applications using such objects. For example, implementations discussed herein can identify security vulnerabilities such as type confusion vulnerabilities that can result in arbitrary code execution, code injection, application failure, or other undesirable or unintended behavior of an application using information about objects identified by analysis of operations described in binary code.

As used herein, the term "software module" refers to a group of code representing instructions that can be executed at a computing system or processor to perform some functionality. Applications, software libraries (e.g., statically-linked libraries or dynamically-linked libraries), and application frameworks are examples of software modules. Additionally, as used herein, the terms "operations described in binary code" and "operations defined in binary code" and similar terms or phrases refer to operations described by code representing instructions that exist in a binary code representation (or binary representation) of a software module. In some implementations discussed herein, operations described in binary code are analyzed (e.g., parsed and interpreted) in a representation other than a binary code representation of a software module. For example, an object analysis system can analyze operations described in binary code using an intermediate representation of a software module derived from a binary code representation of that software module.

Accordingly, implementations discussed herein with reference to analysis of operations described in binary code should be understood to refer to analysis of those operations using a binary code representation of a software module or a representation of the software module derived from the binary code representation.

A variable within a memory is a memory location at which one or more values can be stored. Such a memory location can be at a processor memory (e.g., a register or cache), at a system memory (e.g., a Random Access Memory (RAM) of a computing system), or at some other memory. Operations within binary code that operate on such variables can refer to a memory address (either absolute or relative to another memory address such as an offset from a stack pointer) of that memory location. Thus, the identifier (e.g., memory address) of an object can be stored as a value at a memory location with a memory address that is used by operations within the binary code.

Accordingly, as used herein, terms such as "identifier of an object" and "memory address of an object" should be understood to refer to the identifier (e.g., memory address) itself or to a variable at which a value representing the identifier is stored. As used herein, the term "module" refers to a combination of hardware (e.g., a processor such as an integrated circuit or other circuitry) and software (e.g., machine- or processor-executable instructions, commands, or code such as firmware, programming, or object code).

A combination of hardware and software includes hardware only (i.e., a hardware element with no software elements), software hosted at hardware (e.g., software that is stored at a memory and executed or interpreted at a processor), or at hardware and software hosted at hardware.

Additionally, as used herein, the singular forms "a," "an," and "the" include plural referents unless the context clearly dictates otherwise. Thus, for example, the term "module" is intended to mean one or more modules or a combination of modules. Furthermore, as used herein, the term "based on" includes based at least in part on. Thus, a feature that is described as based on some cause, can be based only on that cause, or based on that cause and on one or more other causes.

It will be apparent that multiple embodiments of this disclosure may be practiced without some or all of these specific details. In other instances, well-known process operations have not been described in detail in order not to unnecessarily obscure the present embodiments. The following description of embodiments includes references to the accompanying drawing. The drawing shows illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Alluding to the above, for purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Figure 6:
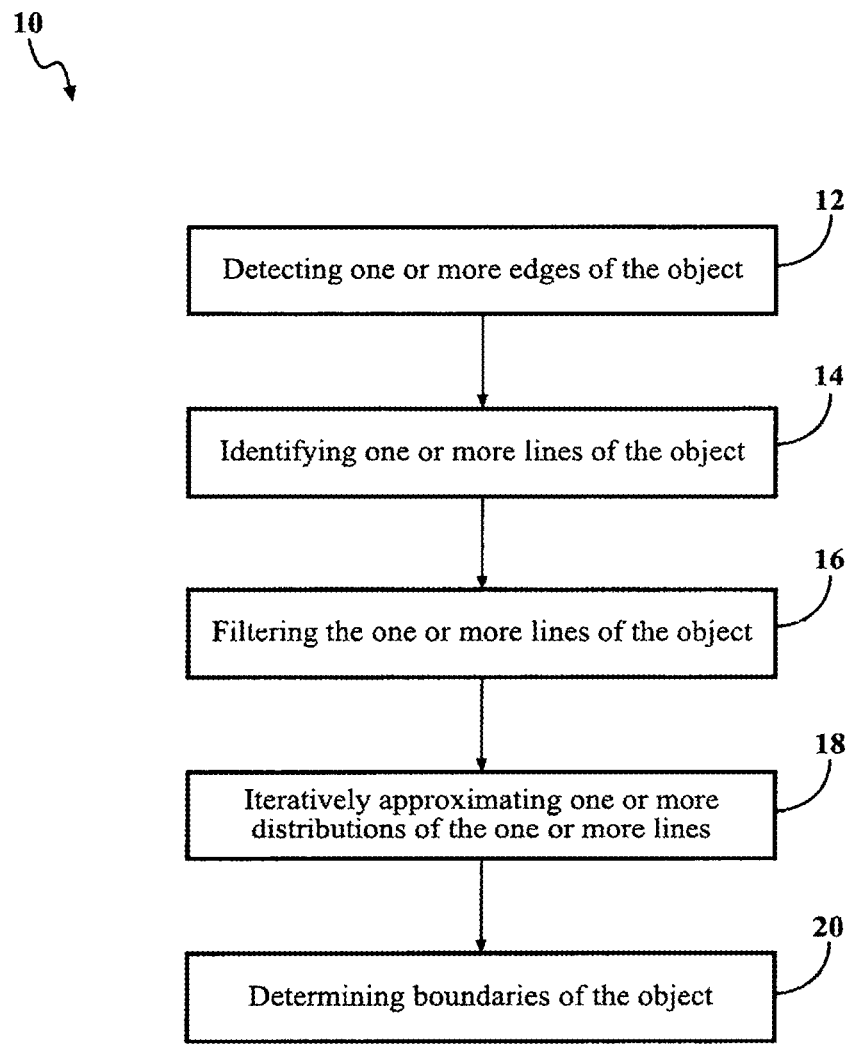
FIG. 6 illustrates a schematic view of a method of using augmented reality (AR) to detect a plane and a spatial configuration of an object.

Referring to FIG. 6, a computer-implemented method of using augmented reality (AR) to detect a plane and a spatial configuration of an object is generally shown at 10. The method 10 includes a step of detecting one or more edges of the object 12 followed by a step of identifying one or more lines of the object 14 and filtering the one or more lines of the object 16. The method further includes a step of iteratively approximating one or more distributions of the one or more lines 16 followed by determining boundaries of the object 18.

The method 10 further includes a step of detecting one or more edges of the object is based on an adaptive binarization and a variance thresholding. The adaptive binarization is determined based on a threshold that is calculated as a function of image intensities in a local area of a pixel having x and y coordinates.

The variance thresholding comprises storing a value of an intensity variance in a pixel having x and y coordinates to establish a variance map, wherein said variance thresholding is calculated based on a maximum value of the intensity variance over the object. The method of the present invention further includes the step of establishing an edge mask for the one or more edges, wherein the edge mask is computed as a sum of the adaptive binarization and the variance thresholding.

The step of identifying one or more lines comprises detecting one or more lines in an edge mask by implementing Hough transform technique. The step of filtering the one or more lines of the object comprises determining if the one or more lines are vertical, horizontal, or diagonal. The step of iteratively approximating distributions of the one or more lines comprises estimating a coefficient for each of the one or more lines, wherein the coefficient is estimated separately for horizontal lines and vertical lines.

The method further comprises the step of identifying one or more lines not belonging to the object; and filtering by the step of iterative approximation the one or more lines not belonging to the object. In response to more than one plane detected for the object, a histogram of distribution of the coefficient is calculated. The step of determining boundaries of the object comprises determining outermost lines in the one or more distributions such that one or more intersections of the one or more lines are inside an image of the object and inside a segmentation mask.

Alluding to the above, the step of edges detection is based on two algorithms: adaptive binarization and variance thresholding. Adaptive binarization is an image transform:

$$1 \to B: B(x,y) = \{1, I(x,y) > Thr(x,y) 0, I(x,y) \leq Thr(x,y),$$

where threshold Thr(x,y) is calculated as a function of image intensities in local area of pixel at {x,y} coordinates. Variance thresholding is an image transform: I→V:V(x,y) ={1,D(x,y)>ThrV0,D(x,y)≤ThrV D is variance map where in each pixel {x,y} a value of intensities variance is stored, which was computed in a local area [−4,+4] of this pixel both for x and y axis. Threshold ThrV is computed relative to maximal value of variance over image. For example, ThrV may be equal to 0.1*max(D). Edges mask is computed as M=B&V. Example of edges mask is shown in FIG. 1.

Figure 2:
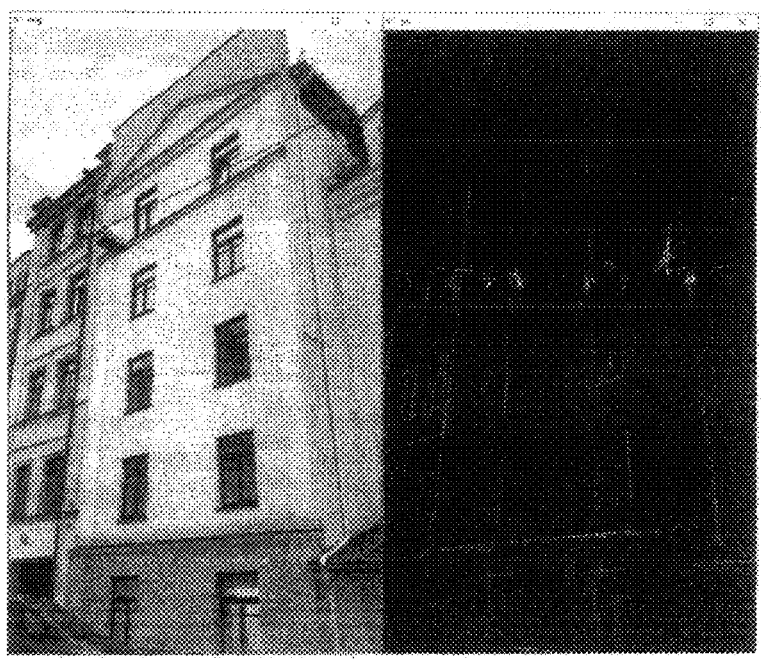
FIG. 2 illustrates detected and filtered horizontal and vertical lines (right) which were detected in edges mask computed for image on the left.

Lines are detected in edges mask M by applying Hough algorithm with thresholds on minimal line length and maximal gap in line set in fractions of image width. Detected lines pass through filtering procedure, which determines if line is vertical, horizontal or diagonal. Line is treated as horizontal if absolute angular distance (L1) between x axis and this line is less than 30 deg. Line is treated as vertical if absolute angular distance between y axis and this line is less than 30 deg. Other lines are defined as diagonal. Detected and filtered horizontal lines are shown in green and vertical lines are shown in FIG. 2.

Each detected line can be described by equation y=a*x+b. For horizontal lines on perspective transformed plane we can expect dependency of a on b which is searched as a linear function:

$$a=k*b+c \quad (1)$$

Coefficients of this linear equation are estimated by least squares method separately for horizontal lines and for vertical lines described by equation x=a*y+b. Coefficients kh,ch (horizontal) and kv,cv (vertical) determine distribution of horizontal and vertical lines. For example, on a chosen "height" h equation of horizontal line will be as follows:

$$y=a*x+b, \text{ where } b=h; a=kh*b+ch$$

Figure 3:
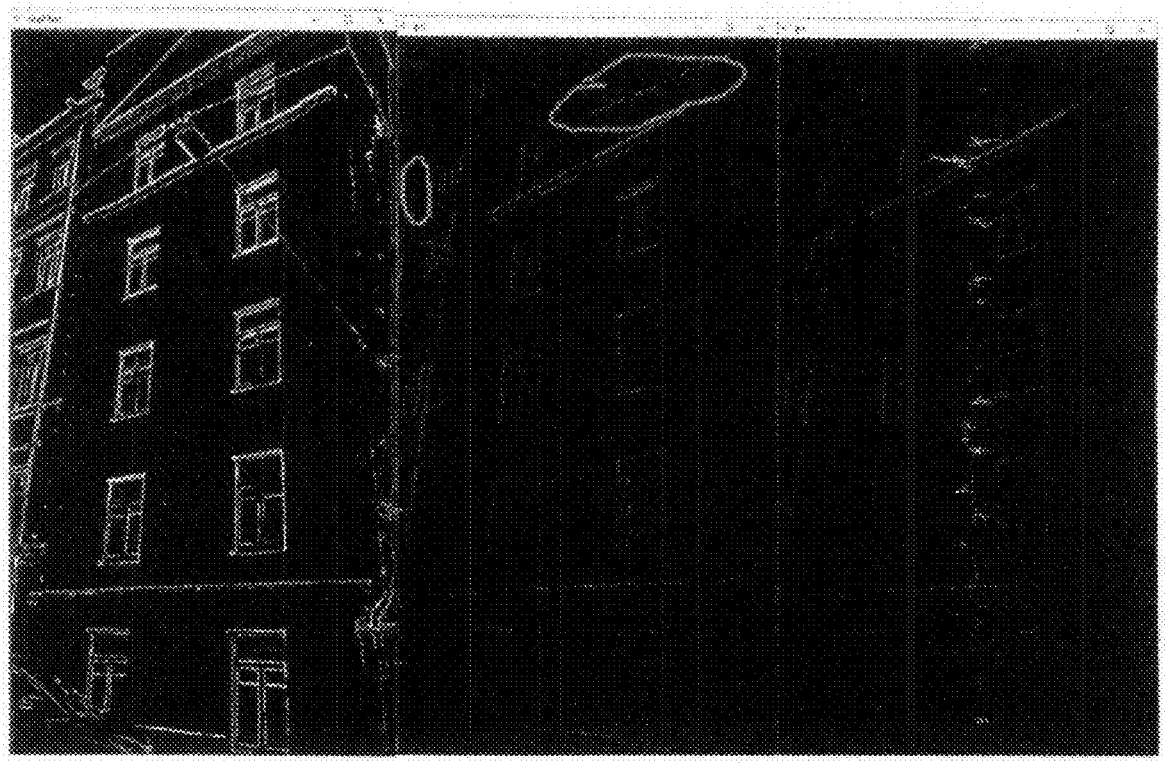
FIG. 3 illustrates a distributions of horizontal and vertical lines (left) and same lines drawn over the image (right)
Figure 5:
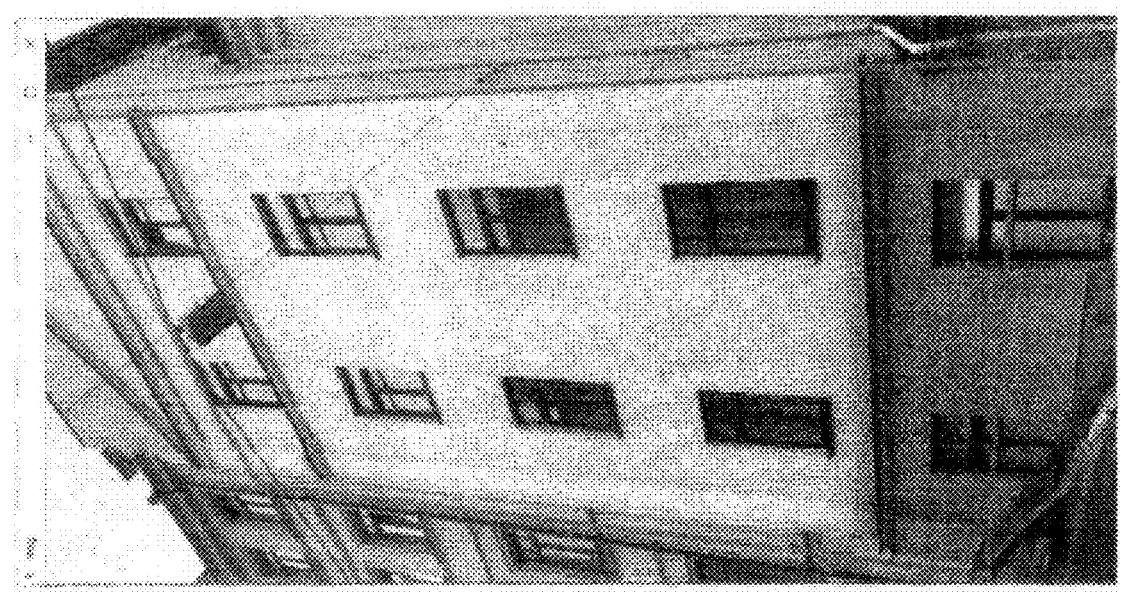
FIG. 5 illustrates a determined facade plane boundaries.

Examples of such lines distribution are shown in FIG. 3.

Figure 4:
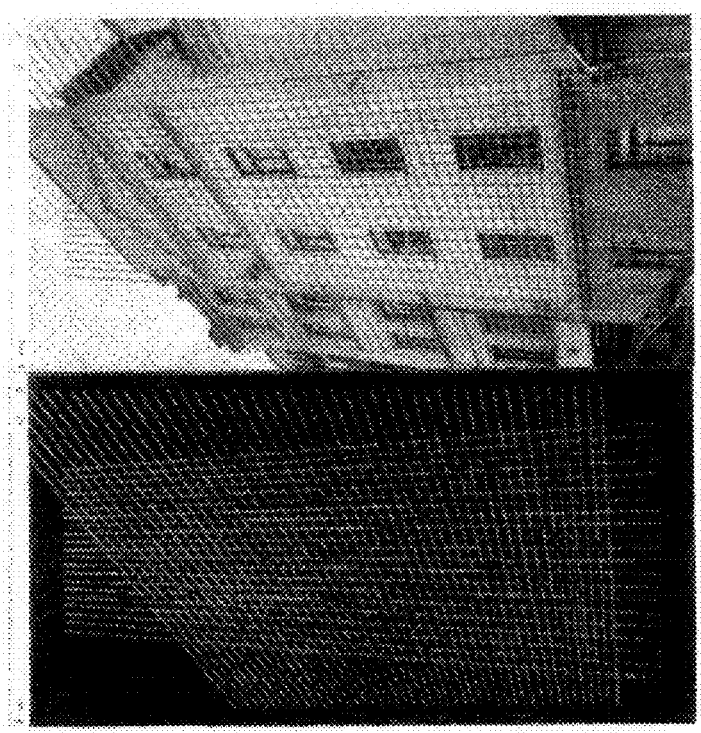
FIG. 4 illustrates a left edges mask; center detected horizontal line are shown in green, detected vertical lines are shown in red, lines, which does not fit approximation model well are marked in blue; right second iteration of approximation, only those lines are accounted which fit first-iteration approximation well.

Due to some lines in images do not belong to façade elements (trees, wires) they may lead to inaccurate approximation of lines in façade image. Therefore, they are filtered by iterative approximation procedure. On first step of this procedure, all detected horizontal lines are approximated by kh,ch coefficients. On next step, horizontal lines are evaluated as how they fit this approximation and only such lines are chosen for next step which has low mismatch with linear approximation estimated on first step. Then, next approximation is performed which accounts only chosen lines. Examples of first and second iteration of approximation are shown in FIG. 4.

Lines which have over-threshold mismatch with approximation model of first iteration. Then, if we switch to intermediary template and compute local perspective transform between it and current image we can compute global transform from initial template to current image by multiplying transition transform matrix and local transform matrix. Thus, if a number of intermediary templates were created, then tracker switches to such intermediary template that is most close to current image.

If several planes are presented in an image, it means that several distributions of lines exist there with different coefficient kh,ch,kv,cv (see formula 1). Least square method ends up in a single model which tries to fit to all lines distributions with smallest square error between it and detected lines. In fact, in such case single model ("average" model) would not fit to any distribution well.

Instead of trying to fit "average" model to all detected lines distributions, alternative approach is to find most manifesting lines distributions by searching local maxima in histograms of distribution of coefficients kh,ch,kv,cv. Particular values of this coefficients for histogram computing are calculated by solving a system of linear equations (each as in formula 1) for pair of linearly-independent lines. All possible pairs of detected lines (separately horizontal and vertical) are accounted. Histogram is computed by Parzen-Rosenblatt window method with either Gaussian (smoother histogram) or triangular (computationally low-cost) kernel.

Each maximum in histogram means existence of lines distribution with correspondent parameter, which is one of kh,ch,kv,cv. For computational optimization, maximum is determined in two steps. First step is computing rough histograms (with low number of bins—500 or less) of coefficients distribution and detection maxima in it. Second step is computing of fine-grained histograms of coefficients distribution only in local area of maxima found on first step. Thus, high fitting accuracy is reached with low computation cost comparing to one-iteration variant of searching maxima in a histogram with high number of bins.

Boundaries of façade plane are determined as most outer lines in distribution, as shown in FIG. 3, such that intersections of these lines are inside image and inside segmentation mask (in a case if preliminary segmentation method was used which generated segmentation mask of façade surface). Example of such outer lines are shown in green in FIG. 5.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of using augmented reality (AR) to detect a plane and a spatial configuration of an object, the method comprising the steps of:
    detecting one or more edges of the object;
    identifying one or more lines of the object by detecting the one or more lines in an edge mask;
    filtering the one or more lines of the object, wherein said filtering comprises determining if each of the one or more lines is vertical, horizontal, or diagonal;
    iteratively approximating one or more distributions of the one or more lines by estimating a coefficient for each of the one or more lines, wherein the coefficient identifies a distribution of horizontal and vertical lines, wherein the coefficient is estimated by a least squares method separately for horizontal and vertical lines, and wherein the coefficient is used to determine the distribution of horizontal and vertical lines;
    identifying one or more lines not belonging to the object;
    filtering by the step of iterative approximation the one or more lines not belonging to the object, wherein said filtering by the step of iterative approximation the one or more lines not belonging to the object includes (a) a step of linear approximation of horizontal lines by a horizontal line coefficient, (b) a step of evaluation of the horizontal lines for a fit to the linear approximation, and (c) a step of selection of the horizontal lines that have a low mismatch with the linear approximation; and
    determining boundaries of the object.

2. The method of claim 1, wherein said detecting one or more edges of the object is based on a first image transformation and a second image transformation, and wherein the first image transformation is performed via an adaptive binarization and the second image transformation is performed via a variance thresholding.

3. The method of claim 2, wherein the adaptive binarization includes a calculation of a threshold, wherein the threshold is calculated as a function of image intensities in a local area of a pixel having x and y coordinates, wherein the variance thresholding includes a calculation of a variance threshold, and wherein the variance threshold is computed relative to a maximum value of variance over the image.

4. The method of claim 2, wherein the variance thresholding includes a variance map having one or more pixels at x and y coordinates, wherein in each pixel of the one or more pixels at x and y coordinates a value of intensity variance is stored, wherein the value of intensity variance is computed in a local area of each pixel for both x and y axis.

5. The method of claim 2 further comprising establishing an edge mask for the one or more edges, wherein the edge mask is computed as a sum of the adaptive binarization and the variance thresholding.

6. The method of claim 1, wherein said identifying one or more lines of the object comprises detecting one or more lines in the edge mask by implementing Hough transform technique.

7. The method of claim 1, wherein the one or more lines are determined as being horizontal or vertical when an absolute angular distance between respective x axis or y axis and the one or more lines is less than 30 degrees.

8. The method of claim 1, wherein the step of identifying one or more lines of the object includes detecting horizontal lines, and wherein the step of filtering by iterative approximation the one or more lines not belonging to the object includes approximating each detected horizontal line by one or more horizontal coefficients.

9. The method of claim 8, wherein, in response to more than one plane detected for the object, a histogram of distribution of the coefficient is calculated.

10. The method of claim 1, wherein said determining boundaries of the object comprises determining outermost lines in the one or more distributions such that one or more intersections of the one or more lines are inside an image of the object and inside a segmentation mask.

11. A method of using augmented reality (AR) to detect a plane and a spatial configuration of an object, the method comprising the steps of:
    detecting one or more edges of the object;
    identifying one or more lines of the object by detecting the one or more lines in an edge mask;
    filtering the one or more lines of the object, wherein said filtering comprises determining if the one or more lines are vertical, horizontal, or diagonal;
    iteratively approximating one or more distributions of the one or more lines by estimating a coefficient for each of the one or more lines, wherein the coefficient is estimated separately for horizontal and vertical lines, wherein the coefficient is estimated by a least squares method separately for horizontal and vertical lines, and wherein the coefficient is used to determine the distribution of horizontal and vertical lines;
    identifying one or more lines not belonging to the object;
    filtering by iterative approximation the one or more lines not belonging to the object, wherein said filtering by the step of iterative approximation the one or more lines not belonging to the object includes (a) a step of linear approximation of horizontal lines by a horizontal line coefficient, (b) a step of evaluation of the horizontal lines for a fit to the linear approximation, and (c) a step of selection of the horizontal lines that have a low mismatch with the linear approximation, wherein in response to more than one plane being detected for the object, a histogram of distribution of the coefficient is calculated; and
    determining boundaries of the object by determining outermost lines in the one or more distributions such that one or more intersections of the one or more lines are inside an image of the object and inside a segmentation mask.

12. The method of claim 11, wherein the one or more lines are determined as being horizontal or vertical when an absolute angular distance between respective x axis or y axis and the one or more lines is less than 30 degrees.

13. The method of claim 11, wherein the coefficient is estimated by a least squares method separately for horizontal and vertical lines and determines the distribution of horizontal and vertical lines.

* * * * *